March 22, 1966  A. LAUDISA  3,241,190
APPARATUS FOR VULCANIZING AND/OR RETREADING PNEUMATIC TIRES
Filed Nov. 14, 1962  6 Sheets-Sheet 1

INVENTOR.
Alberto Laudisa
BY
Michael J. Striker
Atty

March 22, 1966  A. LAUDISA  3,241,190
APPARATUS FOR VULCANIZING AND/OR RETREADING PNEUMATIC TIRES
Filed Nov. 14, 1962  6 Sheets-Sheet 3

INVENTOR.
Alberto Laudisa
BY
Michael J. Striker
ATT

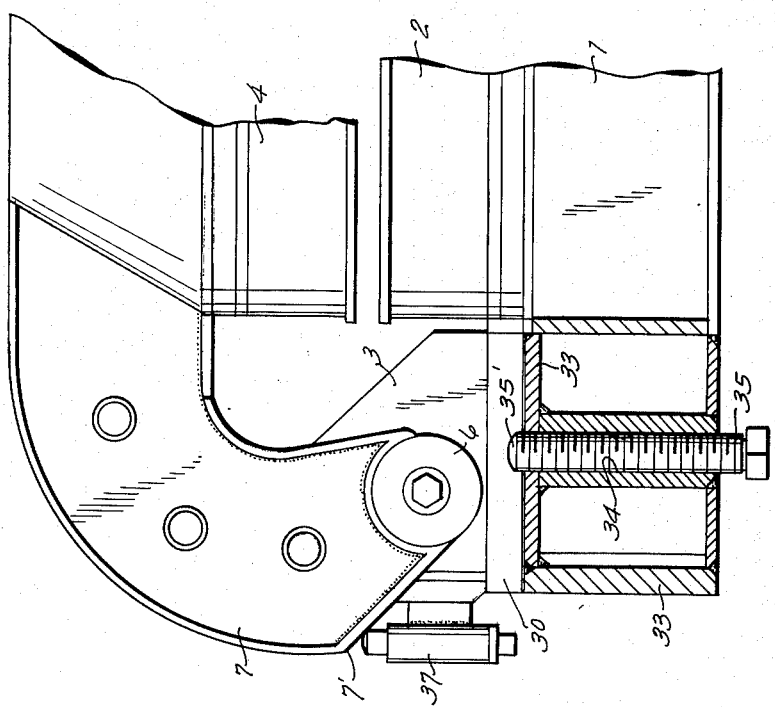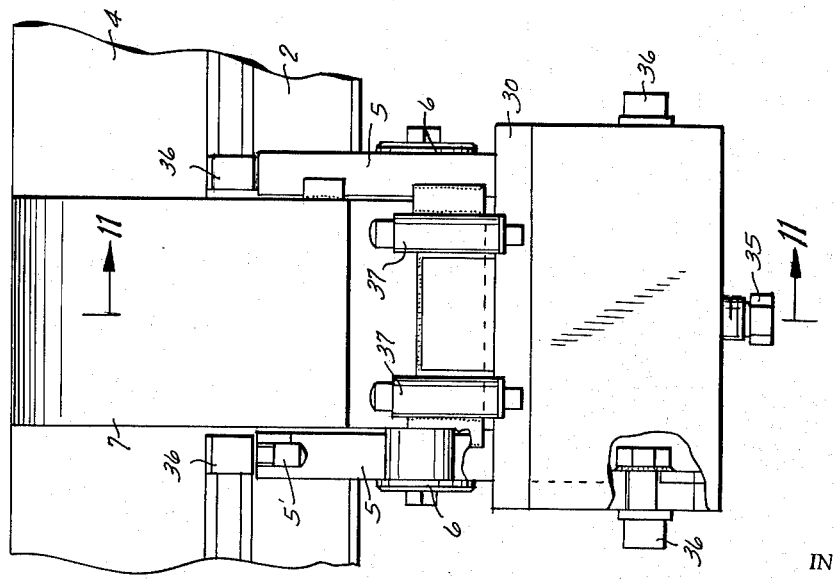

March 22, 1966  A. LAUDISA  3,241,190
APPARATUS FOR VULCANIZING AND/OR RETREADING PNEUMATIC TIRES
Filed Nov. 14, 1962  6 Sheets-Sheet 5

INVENTOR.
Alberto Laudisa
BY
Michael J. Striker

March 22, 1966  A. LAUDISA  3,241,190
APPARATUS FOR VULCANIZING AND/OR RETREADING PNEUMATIC TIRES
Filed Nov. 14, 1962  6 Sheets-Sheet 6

INVENTOR.
Alberto Laudisa
BY
Michael J. Striker
Atty.

United States Patent Office 3,241,190
Patented Mar. 22, 1966

3,241,190
APPARATUS FOR VULCANIZING AND/OR RETREADING PNEUMATIC TIRES
Alberto Laudisa, Via Pasubio 5, Parma, Italy
Filed Nov. 14, 1962, Ser. No. 237,623
Claims priority, application Italy, Nov. 18, 1961,
20,725/61
8 Claims. (Cl. 18—17)

This invention relates to apparatus for vulcanizing and/or retreading pneumatic tires and the like and specificially to such apparatus wherein opening and closing involves a pivotal movement of the mold parts.

In the conventional apparatus in which the tires are usually molded in autoclave, stripping has hitherto involved much arduous labor and the use of various mechanical contrivances for the purpose of "plucking" the tire out of its mold. Very considerable force is required to do this and unless the operation is carried out with great skill and care it may tend to damage the tire. The conventional apparatus furthermore is provided with screw means or the like for the purpose to lock in place the upper movable drum on the lower stationary drum, which means are operated by the operator at the beginning and ending of each single vulcanizing and/or retreading operation.

An object of the invention is to provide an improved apparatus for vulcanizing and/or retreading pneumatic tires provided with simple and efficient arangements whereby tires are stripped from the molds automatically.

Another object of the invention is to provide an apparatus on which the upper movable drum is locked over the lower stationary drum without the use of any screw means or the like, thus allowing a faster and expedite vulcanization and/or retreading operation of the tire.

Another object of this invention is to provide a vulcanizing and/or retreading apparatus which is highly useful and simple in construction. Convenience of arrangement and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following claims; hence I do not limit my invention to the exact arrangements and combinations of the said devices and parts as described in the specification, nor do I confine myself to the exact details of the construction of the said parts as illustrated in the accompanying drawings.

With the foregoing and other objects in view, which will be made manifest in the detailed description, reference is had to the accompanying drawings for the illustrative embodiment of the invention, wherein:

FIG. 8 is an enlarged rear view showing further adjusting means for the upper drum, in said view some parts are broken away to illustrate interior parts in section;

FIG. 11 is a sectional view along line 11—11 of FIG. 8;

Figure 2:
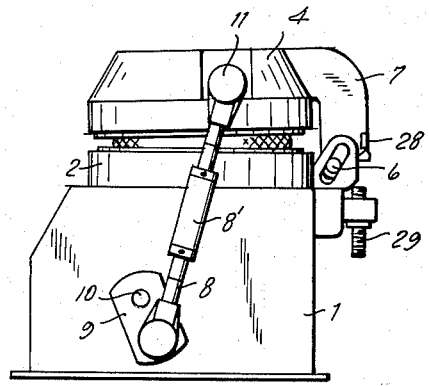
FIGS. 2 and 3 are schematic side elevations showing the apparatus in two different positions during the relative opening movement of the two drums.
Figure 3:
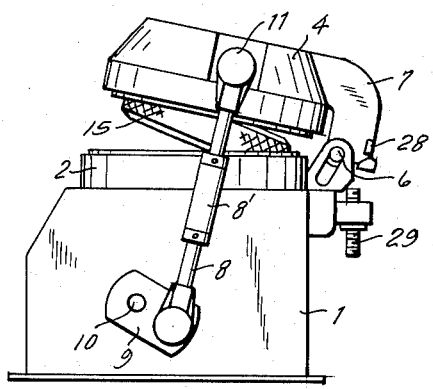
Figure 4:
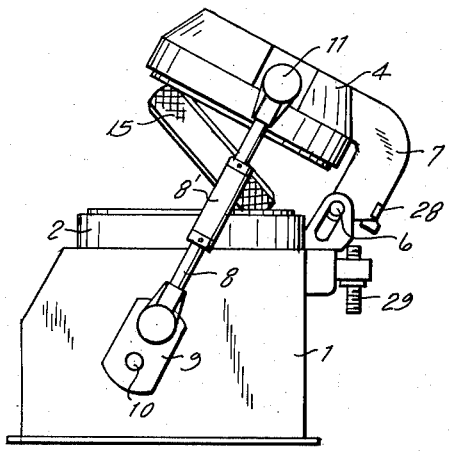
FIG. 4 is a schematic side elevation showing the apparatus in full open position.
Figure 5:
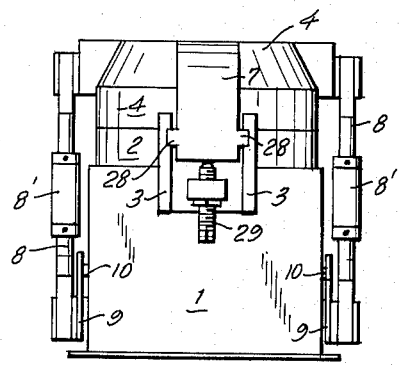
FIG. 5 is a schematic rear view of the apparatus in closed position.
Figure 6:
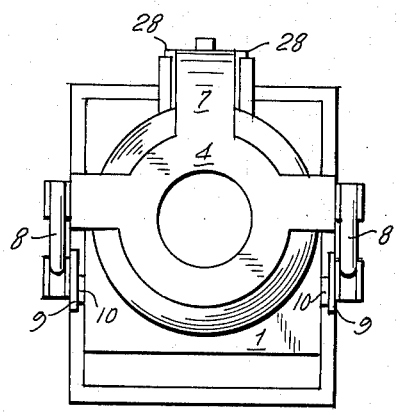
FIG. 6 is a schematic plan view of the apparatus in closed position.
Figure 12:
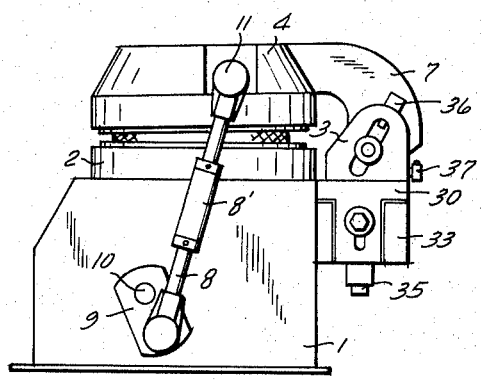
Figure 13:
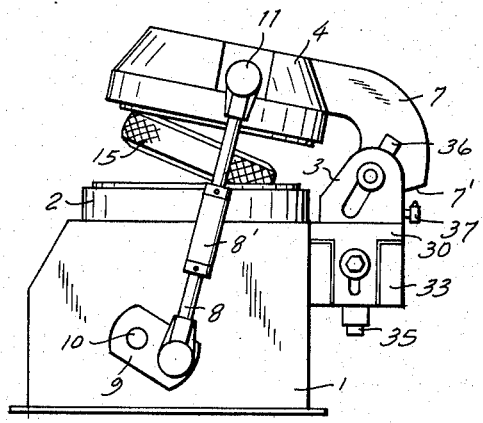
Figure 14:
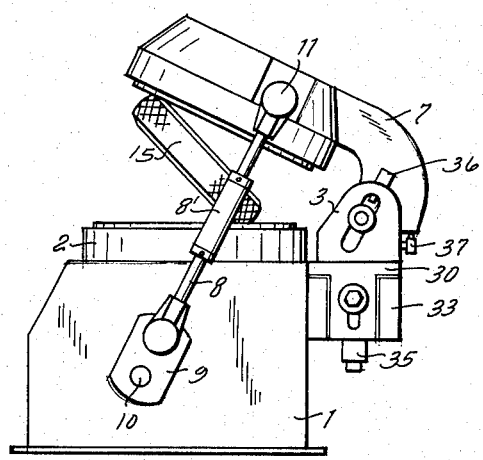

FIGS. 12, 13 and 14 are schematic side elevations, similar to FIGURES 2, 3 and 4, showing an apparatus constructed in accordance with this invention and provided with the adjusting means shown in FIGURES 8, 9, 10 and 11.

With particular reference to FIGURES from 1 to 7, the numeral 1 designates a base member of the apparatus on the upper part of which is bodily supported the lower stationary drum 2 and on the upper rear part of which are disposed the ear shaped members 3 for pivotally supporting the upper movable drum 4. Connected to said upper drum 4 is a bent arm 7 carrying on its free end two pins 6 adapt to slide along the inclined slots 5 of the ear shaped members 3.

Figure 1:
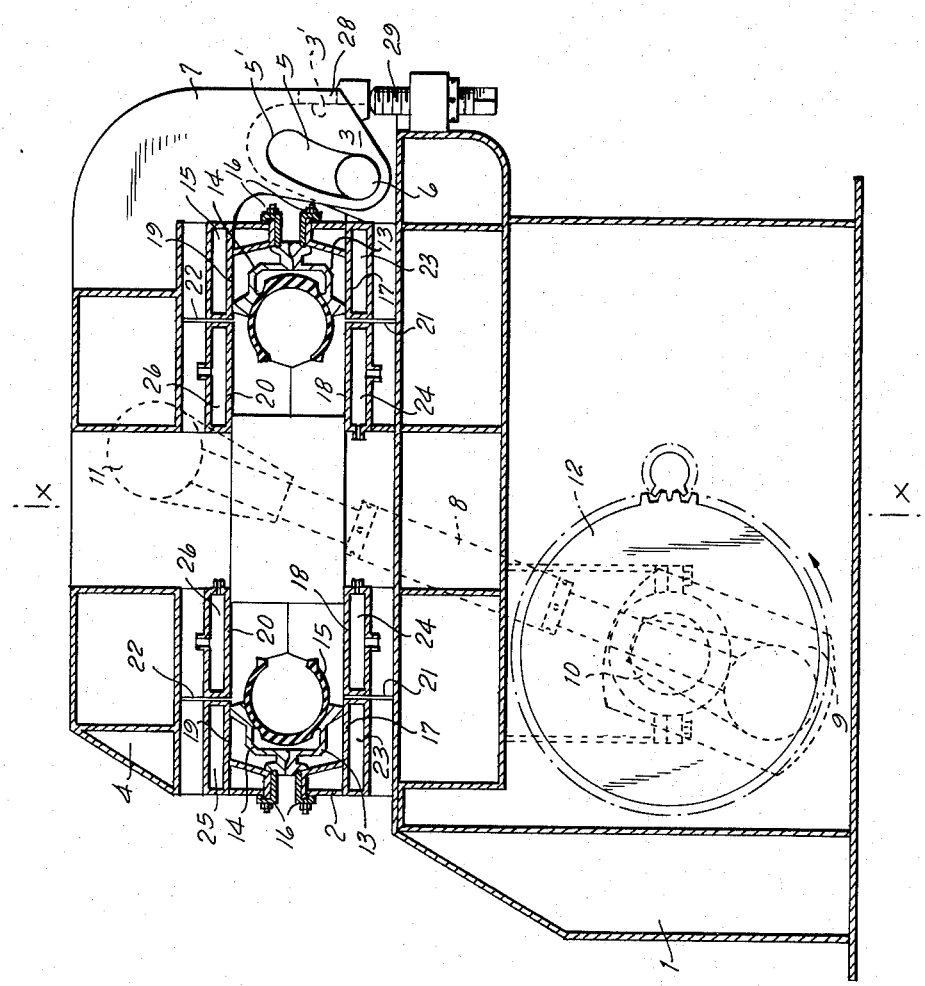
FIG. 1 is a cross-sectional elevation of the preferred form of my invention showing the apparatus in closed position.

Inside the base member 1 are disposed driving means, schematically shown in FIGURE 1 and designated with 12, provided with a driving shaft 10 projecting with its extremities beyond the sides of the base member 1. On each end of said shaft 10 is keyed a crank member 9 carrying a connecting rod 8, said connecting rods 8 are preferably in two pieces, which pieces are connected to turnbuckles connectors 8' for adjusting the length of each connecting rod 8. The free ends of said rods 8 are pivoted in 11 to the upper drum 4, as shown in FIG. 1; said pivoting points 11 are located in a position which is comprised between the center line x—x of said upper drum 4 and the pivoting point of the latter.

Figure 7:
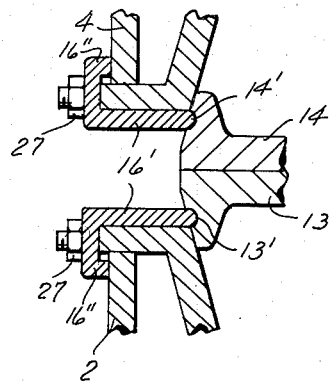
FIG. 7 is an enlarged sectional view showing preferred means for locking in place the mold halves respectively to the upper and lower drums.
Figure 9:
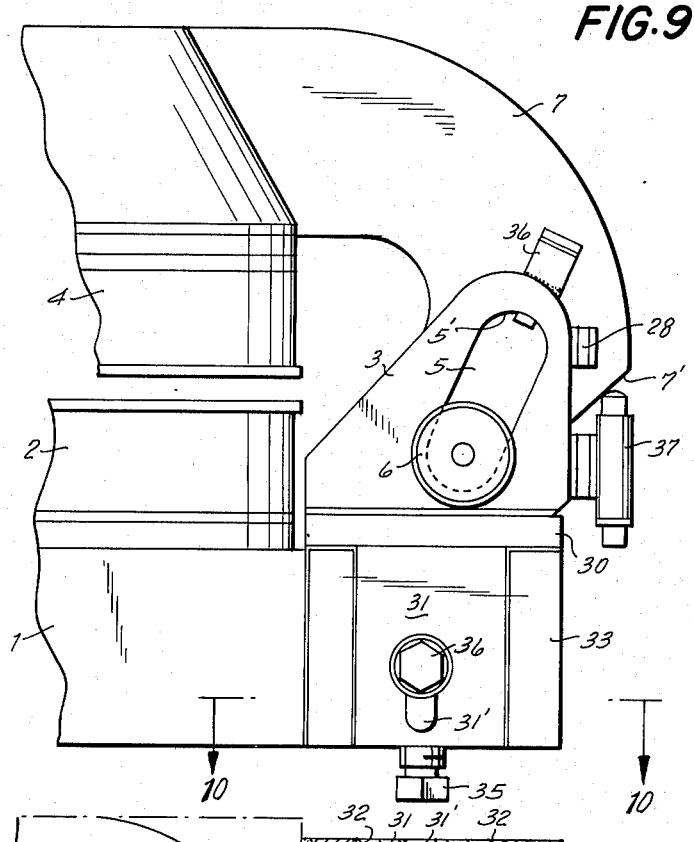
FIG. 9 is an enlarged side elevation of the adjusting means shown in FIG. 8.
Figure 10:
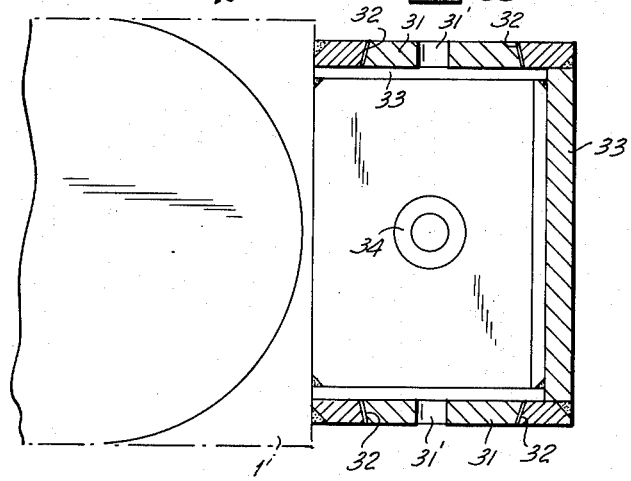
FIG. 10 is a sectional view along line 10—10 of FIG. 9.

Inside the lower drum and upper drum 4 are disposed the two half-molds 13 and 14 (FIGS. 1 and 7). Said half-molds may be advantageously locked to the respective drums by means of L shaped members 16 the short arms 16" of which are adapt to cooperate with the peripheral edges of the drums while the long arms 16' are adapt to cooperate with the grooves 13' and 14' respectively on the outer peripheral sides of the half-molds 13 and 14 (see FIG. 7).

The lower and upper drums 2 and 4 are each provided with circular and concentric plates respectively 17, 18, 19 and 20 spaced by air spaces 21 and 22, said air spaces are provided to avoid the heat transferring from plates 18 and 20 respectively to plates 17 and 19 and vice-versa. Under each plate 17, 18, 19 and 20 are provided chambers 23, 24, 25 and 26 for the steam or cooling water passage, there being also provided suitable inlets and outlets for each chamber valved in the conventional manner for controlling the admission and discharge of steam or cooling water to within said chambers.

On the bent arm 7 of the upper drum 4 are sideways disposed two members 28 adapt to cooperate, when said upper drum 4 is in a closed position relative to the lower stationary drum 2, with the portions 3' of the ear shaped members 3. On the back of the base member 1 is disposed the screw member 29 adapt to cooperate with the lower end of bent arm 7 and this to allow a proper adjustment of the closed position of the upper drum 4 relative to the lower drum 2.

Operation is as follows, assuming that "cure," i.e. molding and vulcanizing, of the tire is complete. The driving member 12 is operated to turn the driving shaft 10 counter-clockwise. During the first step of said rotation the system crank-connecting rod 8–9 initiates opening movement of the rear portion of the upper drum 4 (see FIG. 2) and pins 6 are compelled to slide along the inclined slots 5 of the ear shaped members 3 so that the upper drum 4 performs a first motion of translation along an inclined plane parallel to the inclined axis of slots 5. During said translation the forward portion of drum 4 drags the tire 15, strips it from the lower half-mold 13 and shifts it in the position shown in FIG. 3. Upper drum 4 is further translated by the rotation of driving shaft 10 until pins 6 engage the ends 5' of the inclined slots 5 (see FIG. 3). During the last step of the rotation of the driving shaft 10, and until the cranks 9 reach the top dead centers, the upper drum 4 being pivoted in 5' through pins 6 performs only a motion of rotation about said pins until it reaches the open position shown in FIG. 4. When the upper drum 4 is in said open position the tire can be easily withdrawn being only slight held by the half-molds 13 and 14.

For successive vulcanizing and/or retreading operation of another tire, after eventually having changed the half-molds and introduced a new tire, the apparatus is closed by operating the driving member 12 to turn clockwise the driving shaft 10. During the closing the upper drum 4 performs the same movements, but inverted, performed as above described during the opening. When the upper drum 4 is fully closed the members 28 cooperate with the rear portions 3' of the ear shaped members 3 thus assuring a proper and safe pressure locking of the upper drum over the lower drum.

If the valcanizing and/or retreading operation requires the heating of all the plates 17, 18, 19 and 20, steam will be admitted within chambers 23, 24, 25 and 26. If only partial heating of the plates is required as—for instance—heating of plates 17 and 19, steam will be admitted only within chambers 23 and 25 while cool or warm water may be admitted, if desired, within chambers 24 and 26.

For locking the half-molds 13 and 14 to the drums 2 and 4 locking members 16 may be used. The long arms 16' of said members cooperate with the grooves 13' and 14' of the molds and short arms 16" cooperate with the peripheral edges of the drums. The position of said long arms 16' is defined by the action of the screw bolts 27 against the short arms 16" of said members 16. To remove the half-molds from the drums is enough to unscrew said bolts 27 and disengage the end portions of long arms 16' from grooves 13' and 14'.

With reference to FIGURES from 8 to 14 will be now described, only as an example, further means for adjusting the closed position of upper drum 4 over the lower drum 2.

In this embodiment the ear shaped members 3 are supported by an adjustable plate 30, the latter being provided with two vertical guide elements 31 slidable along the sliding surfaces 32 of the composite frame 33. Said frame 33 is bodily connected to the rear upper part of the base member 1 and is centrally provided with a threaded hole 34 for the screwing in or out of the screw element 35. When the adjusting of the ear shaped members 3 requires an upward movement the element 35 is screwed into the threaded hole 34 in order to act with its upper end 35' on the lower surface of the plate 30 thus hoisting the latter of the required quantity. When the ear members 3 must be shifted downward, the element 35 is unscrewed and plate 30 will descend for its own weight. On frame 33 are connected two pins 36 slidable, during the upward and downward movements of plate 30, along the slots 31' of the vertical elements 31; said pins cooperating with said slots 31' are adapt to limit the movements of plate 30.

If desired, the apparatus according to the present invention may be provided with shock absorbers 36 adapt to cushion the impact of pins 6 of the upper drum 4 against the upper ends 5' of slots 5 and with shock absorbers 37 adapt to cooperate with the profiled portion 7' of the bent arm 7 when the drum 4 has reached the full open position shown in FIG. 14.

What I claim is:

1. In an apparatus for vulcanizing and retreading penumatic tires, in combination, lower stationary mold means; upper movable mold means superposed upon said lower mold means, said upper mold means being movable with respect to said lower mold means between a closed position in which opposing end faces of said mold means engage each other and an open position in which said end faces are spaced from and inclined relative to each other; pivot pin means fixedly connected to one of said mold means adjacent to the rear edge thereof; guide means fixedly connected to the other mold means for mounting said pivot pin means turnably about its axis and for limited movement of said pivot pin means and guide means relative to each other in a direction inclined at an acute angle to the end face of said stationary mold means, so as to cause initially sideways movement of said other mold means when said pivot means moves along said guide means; and moving means acting on said upper mold means for moving the same between said positions thereof, said moving means being pivotally connected to a portion of said upper mold means located between the center line of the upper mold means and the axis of said pivot pin means and acting on said upper mold means substantially in said direction to cause during the first part of the movement of said upper mold means from said closed to said open position a shifting movement of said upper mold means in said direction relative to said lower mold means and subsequently thereto a turning movement about the axis of said pivot pin means so that a tire treated between said mold means will, during opening of said upper mold means, be slightly compressed in direction transverse to its axis and be subsequently tilted relative to said upper and lower mold means to be disengaged therefrom during the opening movement of said upper mold means.

2. In an apparatus for vulcanizing and retreading pneumatic tires, in combination, lower stationary mold means; upper movable mold means superposed upon said lower mold means, said upper mold means being movable with respect to said lower mold means between a closed position in which opposing end faces of said mold means engage each other and an open position in which said end faces are spaced from and inclined relative to each other; pivot pin means fixedly connected to said upper mold means adjacent to the rear edge thereof; guide means fixedly connected to said lower mold means for mounting said pivot pin means turnably about its axis and for limited movement of said pivot pin means relative to said guide means in a direction upwardly and rearwardly inclined to the end face of said stationary mold means so as to cause initially sideways movement of said other mold means when said pivot means moves along said guide means; and moving means acting on said upper mold means for moving the same between said positions thereof, said moving means being pivotally connected to a portion of said upper mold means located between the center line of the upper mold means and the axis of said pivot pin means and acting on said upper mold means substantially in said direction to cause during the first part of the movement of said upper mold means from said closed to said open position a shifting movement of said upper mold means in said direction relative to said lower mold means and subsequently thereto a turning movement about the axis of said pivot pin means so that a tire treated between said mold means will, during opening of said upper mold means, be slightly compressed in direction transverse to its axis and be subsequently tilted relative to said upper and lower mold means to be disengaged therefrom during the opening movement of said upper mold means.

3. In an apparatus for vulcanizing and retreading pneumatic tires, in combination, a base member; a lower mold means fixedly mounted on said base member; upper movable mold means superposed upon said lower mold means, said upper mold means being movable with respect to said lower mold means between a closed position in which opposing end faces of said mold means abut against each other and an open position in which said end faces are spaced from and inclined relative to each other; an arm fixed to said upper mold means and projecting rearwardly and downwardly therefrom; a pivot pin fixed to said arm in the region of a free end thereof and projecting with opposite portions to opposite sides of said arm; a pair of members fixed to the base member and located on opposite sides of said arm and each formed with an elongated slot closed at opposite ends and extending upwardly and rearwardly inclined to the end face of said lower mold means, said opposite portions of said pivot pin being respectively received in said slots so that said pin may turn about its axis and move along said slots; and moving means acting on said upper mold means for opening and closing the same, said moving means being pivotally connected to said upper mold means at portions thereof located between the center line of the upper mold means and the axis of said pivot pin for exerting a force on said upper mold means substantially in a direction parallel to the longitudinal axis of said slots to cause during the first part of the movement of said upper mold means from said closed to said open position a sideways shifting movement of said upper mold means in direction of the longitudinal axis of said slots and after said pivot pin reaches the upper ends of said slots a pivotal movement about the axis of said pivot pin so that a tire treated between said mold means will, during the first part of the opening movement of said upper mold means, be slightly compressed in direction transverse to its axis and be subsequently tilted relative to said upper and lower mold means to be disengaged therefrom during the opening movement of said upper mold means.

4. An apparatus as set forth in claim 3, wherein said upper and lower mold means each include a drum-shaped member, an interchangeable mold half in each of said members, and means for releasably locking said mold halves in said members.

5. An apparatus as set forth in claim 4 and including means for adjusting the position of the upper drum-shaped member with respect to the lower one.

6. An apparatus as set forth in claim 4 and including means for heating said mold halves.

7. In an apparatus for vulcanizing and retreading pneumatic tires, in combination, a base member; a lower mold means fixedly mounted on said base member; upper movable mold means superposed upon said lower mold means, said upper mold means being movable with respect to said lower mold means between a closed position in which opposing end faces of said mold means abut against each other and an open position in which said end faces are spaced from and inclined relative to each other; an arm fixed to said upper mold means and projecting rearwardly and downwardly therefrom; a pivot pin fixed to said arm in the region of a free end thereof and projecting with opposite portions to opposite sides of said arm; a pair of members fixed to the base member and located on opposite sides of said arm and each formed with an elongated slot closed at opposite ends and extending upwardly and rearwardly inclined to the end face of said lower mold means, said opposite portions of said pivot pin being respectively received in said slots so that said pin may turn about its axis and move along said slots; and moving means acting on said upper mold means for opening and closing the same, said moving means comprising crank means turnably mounted in said base member, and a pair of connecting rod means pivotally connected at the lower ends thereof to said crank means and at the upper ends thereof to said upper mold means at portions thereof located between the center line of the upper mold means and the axis of said pivot pin, said crank means being located at said base member at such a position so that said connecting rod means extend, when said upper mold means is in said closed position and said crank means in a dead center position, substantially parallel to the longitudinal axis of said slots for exerting during turning of said crank means a force on said upper mold means substantially in a direction parallel to the longitudinal axis of said slots to cause during the first part of the movement of said upper mold means from said closed to said open position a sideways shifting movement of said upper mold means in direction of the longitudinal axis of said slots and after said pivot pin reaches the upper ends of said slots a pivotal movement about the axis of said pivot pin so that a tire treated between said mold means will, during the first part of the opening movement of said upper mold means, be slightly compressed in direction transveres to its axis and be subsequently tilted relative to said upper and lower mold means to be disengaged therefrom during the opening movement of said upper mold means.

8. An apparatus as set forth in claim 7, wherein each of said connecting rod means comprises a pair of rods and means for connecting said rods aligned with each other and adjustable in longitudinal direction thereof to change the over-all lengths of the connecting rod means.

References Cited by the Examiner
UNITED STATES PATENTS

| | | | |
|---|---|---|---|
| 1,820,132 | 8/1931 | Fleiter | 18—38 |
| 1,947,335 | 2/1934 | DeMattia | 18—17 |
| 1,989,362 | 1/1935 | Iverson | 18—17 |
| 2,324,818 | 7/1943 | Brundage | 18—17 |
| 2,340,231 | 1/1944 | Soderquist | 18—17 |
| 2,365,764 | 12/1944 | Kastner | 18—2 X |
| 2,375,784 | 5/1945 | Glynn | 18—18 |
| 2,508,522 | 5/1950 | Kastner | 18—17 X |
| 2,736,060 | 2/1956 | Glynn | 18—18 |
| 2,745,137 | 5/1956 | Glynn | 18—18 |
| 2,778,063 | 1/1957 | Duerksen | 18—18 |

J. SPENCER OVERHOLSER, *Primary Examiner.*

MICHAEL V. BRINDISI, WILLIAM J. STEPHENSON,
*Examiners.*